(12) United States Patent
Luo et al.

(10) Patent No.: US 9,438,366 B2
(45) Date of Patent: Sep. 6, 2016

(54) SYSTEM ACCESS FOR HETEROGENEOUS NETWORKS

(75) Inventors: Tao Luo, San Diego, CA (US); Juan Montojo, San Diego, CA (US); Wanshi Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 503 days.

(21) Appl. No.: 13/020,593

(22) Filed: Feb. 3, 2011

(65) Prior Publication Data
US 2012/0033646 A1 Feb. 9, 2012

Related U.S. Application Data

(60) Provisional application No. 61/306,411, filed on Feb. 19, 2010.

(51) Int. Cl.
| | |
|---|---|
| H04B 15/00 | (2006.01) |
| H04L 1/02 | (2006.01) |
| H04W 72/04 | (2009.01) |
| H04J 11/00 | (2006.01) |

(Continued)

(52) U.S. Cl.
CPC ........ *H04J 11/0056* (2013.01); *H04J 11/0069* (2013.01); *H04W 48/20* (2013.01); *H04B 1/7103* (2013.01); *H04W 48/12* (2013.01)

(58) Field of Classification Search
CPC . H04W 24/10; H04W 72/02; H04W 72/082; H04W 72/06; H04W 24/02; H04W 52/244; H04W 48/20; H04B 17/318; H04B 17/345; H04B 1/7103; H04B 1/7107; H04B 1/71075; H04L 5/0048

USPC ....... 370/343, 341, 431, 310–338, 208, 252; 455/450, 63.1, 435.2, 422.1, 525, 500, 455/150.1, 180.1, 452.1, 226.2, 283, 434
See application file for complete search history.

(56) References Cited

U.S. PATENT DOCUMENTS

6,334,047 B1 * 12/2001 Andersson et al. ............ 455/69
8,116,799 B2 * 2/2012 Cho et al. ..................... 455/522

(Continued)

FOREIGN PATENT DOCUMENTS

| CN | 1359209 A | 7/2002 |
|---|---|---|
| CN | 1642351 A | 7/2005 |

(Continued)

OTHER PUBLICATIONS

WO 2010064969 A1; Jun. 2010; Siomina et al.*

(Continued)

*Primary Examiner* — Wutchung Chu
(74) *Attorney, Agent, or Firm* — Nerrie M. Zohn

(57) ABSTRACT

A user equipment (UE) begins to access a heterogeneous network by obtaining synchronization parameters from system signals transmitted by a weaker one of a number of neighboring cells. After synchronizing with the network, the UE obtains resource scheduling information for the weaker cell. The resource scheduling information indicates at least one resource used by the weaker cell. The UE may then cancel the stronger cells of the neighboring cell. The resource scheduling information allows the UE to identify broadcasted system blocks for the weaker cell from which it may decode and retrieve control information used to complete access to the network.

17 Claims, 10 Drawing Sheets

(51) Int. Cl.
*H04W 48/20* (2009.01)
*H04B 1/7103* (2011.01)
*H04W 48/12* (2009.01)

(56) References Cited

U.S. PATENT DOCUMENTS

| | | | | |
|---|---|---|---|---|
| 8,571,567 | B2 * | 10/2013 | Nishio | 455/452.2 |
| 2002/0154717 | A1 * | 10/2002 | Shima | H04B 1/71072 375/349 |
| 2002/0159547 | A1 * | 10/2002 | Lindoff | H04B 1/7105 375/343 |
| 2005/0111408 | A1 * | 5/2005 | Skillermark | H04B 1/7105 370/331 |
| 2005/0276314 | A1 * | 12/2005 | Dateki | H04B 1/7107 375/148 |
| 2006/0141935 | A1 * | 6/2006 | Hou | H04B 1/7103 455/63.1 |
| 2007/0042784 | A1 * | 2/2007 | Anderson | 455/450 |
| 2007/0121554 | A1 * | 5/2007 | Luo | H04B 1/7107 370/335 |
| 2008/0008147 | A1 * | 1/2008 | Nakayama | 370/338 |
| 2008/0108355 | A1 * | 5/2008 | Oleszcsuk | H04W 72/1263 455/442 |
| 2008/0285499 | A1 * | 11/2008 | Zhang | H04B 7/155 370/315 |
| 2009/0088160 | A1 * | 4/2009 | Pani | H04W 36/30 455/436 |
| 2009/0135761 | A1 * | 5/2009 | Khandekar et al. | 370/328 |
| 2009/0196174 | A1 * | 8/2009 | Ji | 370/230.1 |
| 2009/0196245 | A1 * | 8/2009 | Ji | 370/329 |
| 2009/0197588 | A1 * | 8/2009 | Khandekar et al. | 455/422.1 |
| 2009/0227264 | A1 * | 9/2009 | Hwang et al. | 455/452.2 |
| 2009/0245160 | A1 * | 10/2009 | Maltsev et al. | 370/315 |
| 2009/0291640 | A1 * | 11/2009 | Bhattad et al. | 455/63.1 |
| 2010/0069084 | A1 * | 3/2010 | Parkvall et al. | 455/453 |
| 2010/0124930 | A1 * | 5/2010 | Andrews et al. | 455/456.1 |
| 2010/0177722 | A1 * | 7/2010 | Guvenc | 370/329 |
| 2010/0195607 | A1 * | 8/2010 | Lee | H04W 74/0866 370/329 |
| 2010/0309861 | A1 * | 12/2010 | Gorokhov | H04B 1/7103 370/329 |
| 2010/0322145 | A1 * | 12/2010 | Yu et al. | 370/315 |
| 2010/0323614 | A1 * | 12/2010 | Yu et al. | 455/9 |
| 2011/0033186 | A1 * | 2/2011 | Eichinger | H04B 1/126 398/79 |
| 2011/0075611 | A1 * | 3/2011 | Choi | H04L 1/1819 370/329 |
| 2011/0167477 | A1 * | 7/2011 | Piccirillo et al. | 726/4 |
| 2011/0170496 | A1 * | 7/2011 | Fong et al. | 370/329 |
| 2011/0195684 | A1 * | 8/2011 | Zhang | H04B 1/7107 455/226.1 |
| 2011/0211503 | A1 * | 9/2011 | Che | H04L 5/0005 370/280 |
| 2011/0244884 | A1 * | 10/2011 | Kangas et al. | 455/456.1 |
| 2012/0063343 | A1 * | 3/2012 | Yuda et al. | 370/252 |
| 2012/0163512 | A1 * | 6/2012 | Johansson et al. | 375/340 |
| 2012/0320842 | A1 * | 12/2012 | Jeong et al. | 370/329 |
| 2015/0016335 | A1 * | 1/2015 | Yu et al. | 370/315 |

FOREIGN PATENT DOCUMENTS

| | | |
|---|---|---|
| JP | 2007536846 A | 12/2007 |
| WO | WO-2005107304 A1 | 11/2005 |
| WO | WO-2008040448 A1 | 4/2008 |
| WO | 2008081816 A1 | 7/2008 |
| WO | WO2009064700 A2 | 5/2009 |
| WO | WO-2009116751 A2 | 9/2009 |
| WO | 2010005640 A2 | 1/2010 |
| WO | WO2010003034 A1 | 1/2010 |
| WO | WO-2011025772 A1 | 3/2011 |

OTHER PUBLICATIONS

WO 2010/003034 A1; Jan. 2010; Subrahmanya et al.*
Yu et al. (U.S. Appl. No. 61/218,908), filed Jun 19, 2009.*
International Search Report and Written Opinion—PCT/US2011/025497, ISA/EPO—Jun. 30, 2011.
Crisci M., et al., "Preliminary Analysis of the Positioning Capabilities of the Positioning Reference Signals of 3GPP LTE", 5th European Workshop on GNSS Signals and Signal Processing, 9 pages, Dec. 8, 2011.
Taiwan Search Report—TW100105530—TIPO—Oct. 8, 2013.
Nokia Siemens Networks: "LTE & UMTS CSG mobility service interruption times," 3GPP TSG-RAN WG2 Meeting #66 Los Angeles, U.S.A, R2-093981, URL: http://www.3gpp.org/ftp/tsg_ran/WG2_RL2/TSGR2_66bis/Docs/R2-093981.zip, Jun. 28, 2009, 7 Pages.

* cited by examiner

SYSTEM ACCESS FOR HETEROGENEOUS NETWORKS

CROSS-REFERENCE TO RELATED APPLICATIONS

This application claims the benefit of U.S. Provisional Patent Application No. 61/306,411, entitled, "SYSTEM ACCESS OPTIONS FOR LTE-A", filed on Feb. 19, 2010, which is expressly incorporated by reference herein in its entirety.

BACKGROUND

1. Field

Aspects of the present disclosure relate generally to wireless communication systems, and more particularly, to.

2. Background

Wireless communication networks are widely deployed to provide various communication services such as voice, video, packet data, messaging, broadcast, and the like. These wireless networks may be multiple-access networks capable of supporting multiple users by sharing the available network resources. Such networks, which are usually multiple access networks, support communications for multiple users by sharing the available network resources. One example of such a network is the Universal Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). Examples of multiple-access network formats include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations or node Bs that can support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance the UMTS technologies not only to meet the growing demand for mobile broadband access, but to advance and enhance the user experience with mobile communications.

SUMMARY

The various aspects of the present disclosure are directed to a UE accessing a heterogeneous network. The access process being with the UE obtaining synchronization parameters from system signals transmitted by a weaker one of a number of neighboring cells. After synchronizing with the network, the UE obtains resource scheduling information for the weaker cell. The resource scheduling information indicates at least one resource used by the weaker cell. The UE may then cancel the stronger cells of the neighboring cell. The resource scheduling information allows the UE to identify broadcasted system blocks for the weaker cell from which it may decode and retrieve control information used to complete access to the network.

In one aspect of the disclosure, a method of wireless communication for acquiring control information at a UE includes obtaining synchronization parameters from system signals transmitted by a weak cell, where the weak cell is one of multiple neighboring cells and does not have the strongest signal from among the neighboring cells at the UE. The method also includes obtaining resource scheduling information for the weak cell based, at least in part, on the synchronization parameters and canceling at least one strong cell of the neighboring cells, wherein the canceled strong cell is barred from access by the UE. The method further includes identifying broadcasted system blocks from the weak cell using the resource scheduling information and retrieving control information from the broadcasted system blocks.

In an additional aspect of the disclosure, a UE configured for wireless communication includes means for obtaining synchronization parameters from system signals transmitted by a weak cell, where the weak cell is one of multiple neighboring cells and does not have the strongest signal from among the neighboring cells at the UE. The UE also includes means for obtaining resource scheduling information for the weak cell based, at least in part, on the synchronization parameters and means for canceling at least one strong cell of the neighboring cells, wherein the canceled strong cell is barred from access by the UE. The UE also includes means for identifying broadcasted system blocks from the weak cell using the resource scheduling information and means for retrieving control information from the broadcasted system blocks.

In an additional aspect of the disclosure, a computer program product has a computer-readable medium having program code recorded thereon. This program code includes code to obtain synchronization parameters from system signals transmitted by a weak cell, where the weak cell is one of multiple neighboring cells and does not have the strongest signal from among the neighboring cells at the UE. The program code also includes code to obtain resource scheduling information for the weak cell based, at least in part, on the synchronization parameters and code to cancel at least one strong cell of the neighboring cells, wherein the canceled strong cell is barred from access by the UE. The program code also includes code to identify broadcasted system blocks from the weak cell using the resource scheduling information and code to retrieve control information from the broadcasted system blocks.

In an additional aspect of the disclosure, an apparatus includes at least one processor and a memory coupled to the processor. The processor is configured to obtain synchronization parameters from system signals transmitted by a weak cell, where the weak cell is one of multiple neighboring cells and does not have the strongest signal from among the neighboring cells at the UE. The processor is further configured to obtain resource scheduling information for the weak cell based, at least in part, on the synchronization parameters and to cancel at least one strong cell of the neighboring cells, wherein the canceled strong cell is barred from access by the UE. The processor is further configured to identify broadcasted system blocks from the weak cell using the resource scheduling information and to retrieve control information from the broadcasted system blocks.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

The techniques described herein may be used for various wireless communication networks such as CDMA, TDMA, FDMA, OFDMA, SC-FDMA and other networks. The terms "network" and "system" are often used interchangeably. A CDMA network may implement a radio technology, such as Universal Terrestrial Radio Access (UTRA), Telecommunications Industry Association's (TIA's) CDMA2000®, and the like. The UTRA technology includes Wideband CDMA (WCDMA) and other variants of CDMA. The CDMA2000® technology includes the IS-2000, IS-95 and IS-856 standards from the Electronics Industry Alliance (EIA) and TIA. A TDMA network may implement a radio technology, such as Global System for Mobile Communications (GSM). An OFDMA network may implement a radio technology, such as Evolved UTRA (E-UTRA), Ultra Mobile Broadband (UMB), IEEE 802.11 (Wi-Fi), IEEE 802.16 (WiMAX), IEEE 802.20, Flash-OFDMA, and the like. The UTRA and E-UTRA technologies are part of Universal Mobile Telecommunication System (UMTS). 3GPP Long Term Evolution (LTE) and LTE-Advanced (LTE-A) are newer releases of the UMTS that use E-UTRA. UTRA, E-UTRA, UMTS, LTE, LTE-A and GSM are described in documents from an organization called the "3rd Generation Partnership Project" (3GPP). CDMA2000® and UMB are described in documents from an organization called the "3rd Generation Partnership Project 2" (3GPP2). The techniques described herein may be used for the wireless networks and radio access technologies mentioned above, as well as other wireless networks and radio access technologies. For clarity, certain aspects of the techniques are described below for LTE or LTE-A (together referred to in the alternative as "LTE/-A") and use such LTE/-A terminology in much of the description below.

Figure 1:
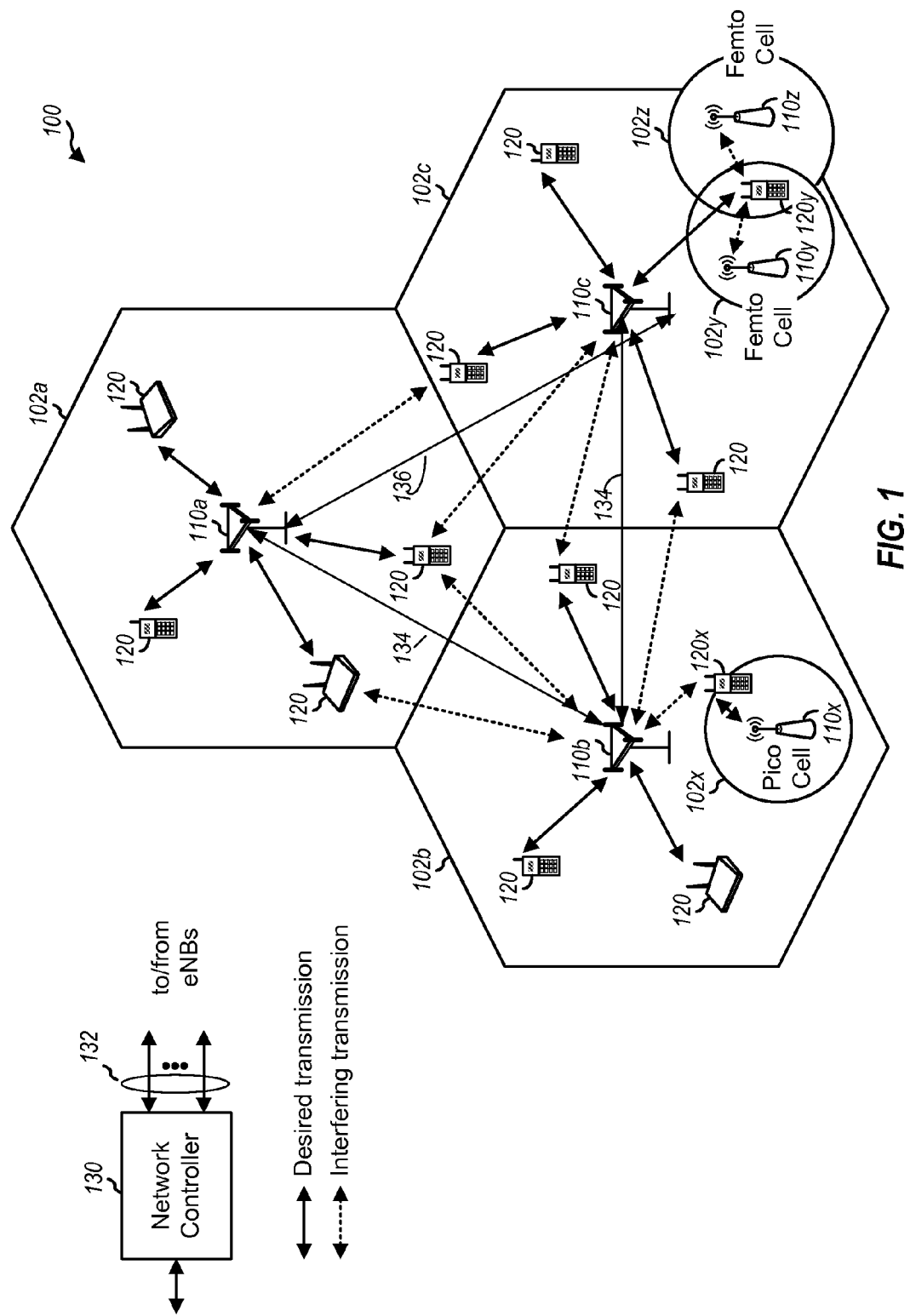
FIG. 1 is a block diagram conceptually illustrating an example of a mobile communication system.

FIG. 1 shows a wireless network 100 for communication, which may be an LTE-A network. The wireless network 100 includes a number of evolved node Bs (eNBs) 110 and other network entities. An eNB may be a station that communicates with the UEs and may also be referred to as a base station, a node B, an access point, and the like. Each eNB 110 may provide communication coverage for a particular geographic area. In 3GPP, the term "cell" can refer to this particular geographic coverage area of an eNB and/or an eNB subsystem serving the coverage area, depending on the context in which the term is used.

An eNB may provide communication coverage for a macro cell, a pico cell, a femto cell, and/or other types of cell. A macro cell generally covers a relatively large geographic area (e.g., several kilometers in radius) and may allow unrestricted access by UEs with service subscriptions with the network provider. A pico cell would generally cover a relatively smaller geographic area and may allow unrestricted access by UEs with service subscriptions with the network provider. A femto cell would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). An eNB for a macro cell may be referred to as a macro eNB. An eNB for a pico cell may be referred to as a pico eNB. And, an eNB for a femto cell may be referred to as a femto eNB or a home eNB. In the example shown in FIG. 1, the eNBs 110a, 110b and 110c are macro eNBs for the macro cells 102a, 102b and 102c, respectively. The eNB 110x is a pico eNB for a pico cell 102x. And, the eNBs 110y and 110z are femto eNBs for the femto cells 102y and 102z, respectively. An eNB may support one or multiple (e.g., two, three, four, and the like) cells.

The wireless network 100 may support synchronous or asynchronous operation. For synchronous operation, the eNBs may have similar frame timing, and transmissions from different eNBs may be approximately aligned in time. For asynchronous operation, the eNBs may have different frame timing, and transmissions from different eNBs may not be aligned in time. The techniques described herein may be used for synchronous operations.

A network controller 130 may couple to a set of eNBs and provide coordination and control for these eNBs. The network controller 130 may communicate with the eNBs 110 via a backhaul 132. The eNBs 110 may also communicate with one another, e.g., directly or indirectly via a wireless backhaul 134 or a wireline backhaul 136.

The UEs 120 are dispersed throughout the wireless network 100, and each UE may be stationary or mobile. A UE may also be referred to as a terminal, a mobile station, a subscriber unit, a station, or the like. A UE may be a cellular phone, a personal digital assistant (PDA), a wireless modem, a wireless communication device, a handheld device, a laptop computer, a cordless phone, a wireless local loop (WLL) station, or the like. A UE may be able to communicate with macro eNBs, pico eNBs, femto eNBs, relays, and the like. In FIG. 1, a solid line with double arrows indicates desired transmissions between a UE and a serving eNB, which is an eNB designated to serve the UE on the downlink and/or uplink. A dashed line with double arrows indicates interfering transmissions between a UE and an eNB.

LTE/-A utilizes orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, or the like. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, K may be equal to 128, 256, 512, 1024 or 2048 for a corresponding system bandwidth of 1.25, 2.5, 5, 10 or 20 megahertz (MHz), respectively. The system bandwidth may also be partitioned into sub-bands. For example, a sub-band may cover 1.08 MHz, and there may be 1, 2, 4, 8 or 16 sub-bands for a corresponding system bandwidth of 1.25, 2.5, 5, 10 or 20 MHz, respectively.

Figure 2:
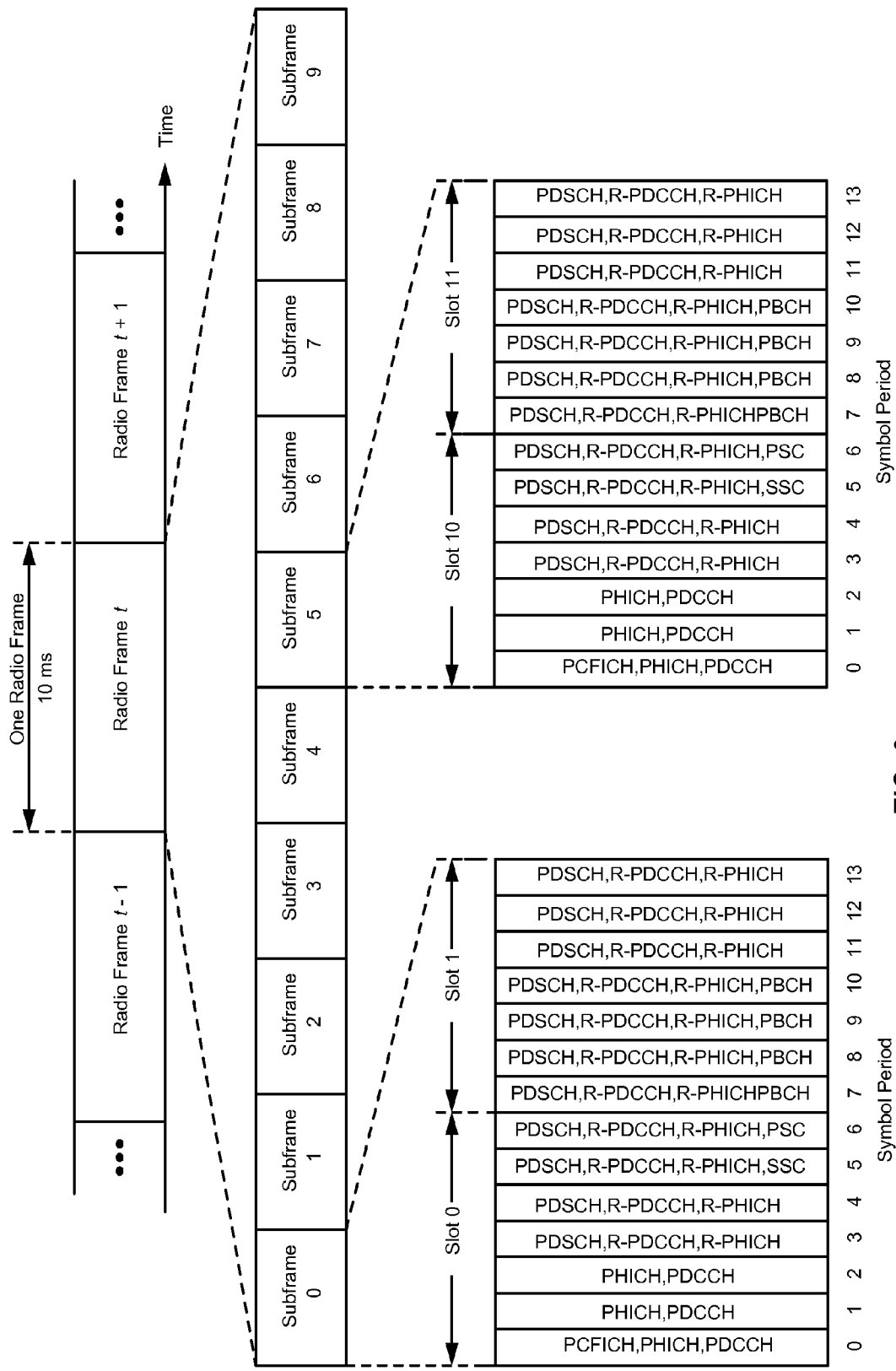
FIG. 2 is a block diagram conceptually illustrating an example of a downlink frame structure in a mobile communication system.

FIG. 2 shows a downlink frame structure used in LTE/-A. The transmission timeline for the downlink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., 7 symbol periods for a normal cyclic prefix (as shown in FIG. 2) or 6 symbol periods for an extended cyclic prefix. The 2L symbol periods in each subframe may be assigned indices of 0 through 2L−1. The available time frequency resources may be partitioned into resource blocks. Each resource block may cover N subcarriers (e.g., 12 subcarriers) in one slot.

In LTE/-A, an eNB may send a primary synchronization signal (PSS) and a secondary synchronization signal (SSS) for each cell in the eNB. The primary and secondary synchronization signals may be sent in symbol periods 6 and 5, respectively, in each of subframes 0 and 5 of each radio frame with the normal cyclic prefix, as shown in FIG. 2. The synchronization signals may be used by UEs for cell detection and acquisition. The eNB may send a Physical Broadcast Channel (PBCH) in symbol periods 0 to 3 in slot 1 of subframe 0. The PBCH may carry certain system information.

The eNB may send a Physical Control Format Indicator Channel (PCFICH) in the first symbol period of each subframe, as seen in FIG. 2. The PCFICH may convey the number of symbol periods (M) used for control channels, where M may be equal to 1, 2 or 3 and may change from subframe to subframe. M may also be equal to 4 for a small system bandwidth, e.g., with less than 10 resource blocks. In the example shown in FIG. 2, M=3. The eNB may send a Physical HARQ Indicator Channel (PHICH) and a Physical Downlink Control Channel (PDCCH) in the first M symbol periods of each subframe. The PDCCH and PHICH are also included in the first three symbol periods in the example shown in FIG. 2. The PHICH may carry information to support hybrid automatic retransmission (HARQ). The PDCCH may carry information on resource allocation for UEs and control information for downlink channels. The eNB may send a Physical Downlink Shared Channel (PDSCH) in the remaining symbol periods of each subframe. The PDSCH may carry data for UEs scheduled for data transmission on the downlink.

In addition to sending PHICH and PDCCH in the control section of each subframe, i.e., the first symbol period of each subframe, the LTE-A may also transmit these control-oriented channels in the data portions of each subframe as well. As shown in FIG. 2, these new control designs utilizing the data region, e.g., the Relay-Physical Downlink Control Channel (R-PDCCH) and Relay-Physical HARQ Indicator Channel (R-PHICH) are included in the later symbol periods of each subframe. The R-PDCCH is a new type of control channel utilizing the data region originally developed in the context of half-duplex relay operation. Different from legacy PDCCH and PHICH, which occupy the first several control symbols in one subframe, R-PDCCH and R-PHICH are mapped to resource elements (REs) originally designated as the data region. The new control channel may be in the form of Frequency Division Multiplexing (FDM), Time Division Multiplexing (TDM), or a combination of FDM and TDM.

The eNB may send the PSS, SSS and PBCH in the center 1.08 MHz of the system bandwidth used by the eNB. The eNB may send the PCFICH and PHICH across the entire system bandwidth in each symbol period in which these channels are sent. The eNB may send the PDCCH to groups of UEs in certain portions of the system bandwidth. The eNB may send the PDSCH to specific UEs in specific portions of the system bandwidth. The eNB may send the PSS, SSS, PBCH, PCFICH and PHICH in a broadcast manner to all UEs, may send the PDCCH in a unicast manner to specific UEs, and may also send the PDSCH in a unicast manner to specific UEs.

A number of resource elements may be available in each symbol period. Each resource element may cover one subcarrier in one symbol period and may be used to send one modulation symbol, which may be a real or complex value. Resource elements not used for a reference signal in each symbol period may be arranged into resource element groups (REGs). Each REG may include four resource elements in one symbol period. The PCFICH may occupy four REGs, which may be spaced approximately equally across frequency, in symbol period 0. The PHICH may occupy three REGs, which may be spread across frequency, in one or more configurable symbol periods. For example, the three REGs for the PHICH may all belong in symbol period 0 or may be spread in symbol periods 0, 1 and 2. The PDCCH may occupy 9, 18, 32 or 64 REGs, which may be selected from the available REGs, in the first M symbol periods. Only certain combinations of REGs may be allowed for the PDCCH.

A UE may know the specific REGs used for the PHICH and the PCFICH. The UE may search different combinations of REGs for the PDCCH. The number of combinations to search is typically less than the number of allowed combinations for the PDCCH. An eNB may send the PDCCH to the UE in any of the combinations that the UE will search.

A UE may be within the coverage of multiple eNBs. One of these eNBs may be selected to serve the UE. The serving eNB may be selected based on various criteria such as received power, path loss, signal-to-noise ratio (SNR), etc.

Figure 3:
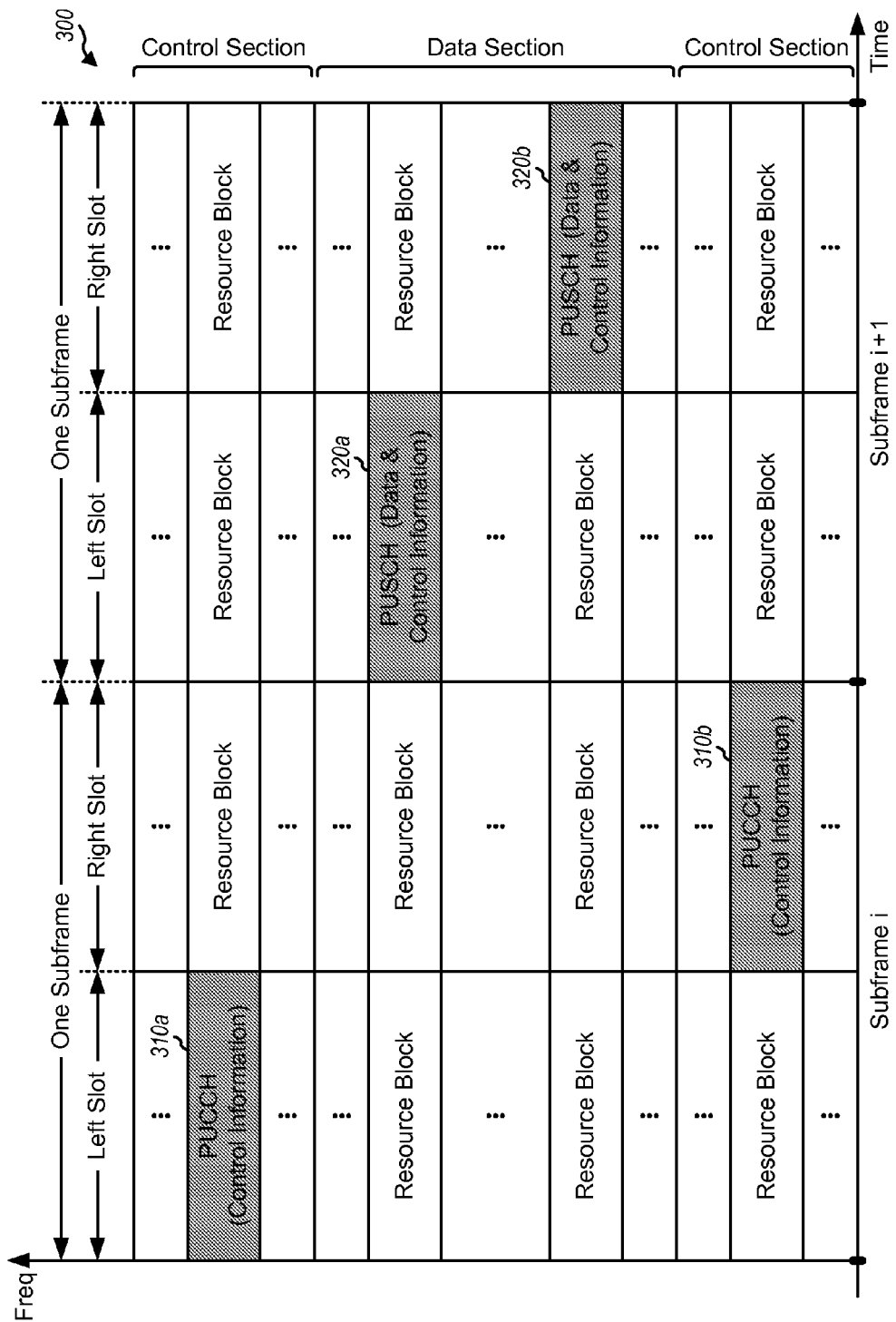
FIG. 3 is a block diagram conceptually illustrating an exemplary frame structure in uplink LTE/-A communications.

FIG. 3 is a block diagram conceptually illustrating an exemplary frame structure 300 in uplink long term evolution (LTE/-A) communications. The available resource blocks (RBs) for the uplink may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The design in FIG. 3 results in the data section including contiguous subcarriers, which may allow a single UE to be assigned all of the contiguous subcarriers in the data section.

A UE may be assigned resource blocks in the control section to transmit control information to an eNB. The UE may also be assigned resource blocks in the data section to transmit data to the eNode B. The UE may transmit control information in a Physical Uplink Control Channel (PUCCH) on the assigned resource blocks 310a and 310b in the control section. The UE may transmit only data or both data and control information in a Physical Uplink Shared Channel (PUSCH) on the assigned resource blocks 320a and 320b in the data section. An uplink transmission may span both slots of a subframe and may hop across frequency as shown in FIG. 3.

Referring back to FIG. 1, the wireless network 100 uses the diverse set of eNBs 110 (i.e., macro eNBs, pico eNBs, femto eNBs, and relays) to improve the spectral efficiency of the system per unit area. Because the wireless network 100 uses such different eNBs for its spectral coverage, it may also be referred to as a heterogeneous network. The macro eNBs 110a-c are usually carefully planned and placed by the provider of the wireless network 100. The macro eNBs 110a-c generally transmit at high power levels (e.g., 5 W-40 W). The pico eNB 110x and the relay station 110r, which generally transmit at substantially lower power levels (e.g., 100 mW-2 W), may be deployed in a relatively unplanned manner to eliminate coverage holes in the coverage area provided by the macro eNBs 110a-c and improve capacity in the hot spots. The femto eNBs 110y-z, which are typically deployed independently from the wireless network 100 may, nonetheless, be incorporated into the coverage area of the wireless network 100 either as a potential access point to the wireless network 100, if authorized by their administrator(s), or at least as an active and aware eNB that may communicate with the other eNBs 110 of the wireless network 100 to perform resource coordination and coordination of interference management. The femto eNBs 110y-z typically also transmit at substantially lower power levels (e.g., 100 mW-2 W) than the macro eNBs 110a-c.

In operation of a heterogeneous network, such as the wireless network 100, each UE is usually served by the eNB 110 with the better signal quality, while the unwanted signals received from the other eNBs 110 are treated as interference. While such operational principals can lead to significantly sub-optimal performance, gains in network performance are realized in the wireless network 100 by using intelligent resource coordination among the eNBs 110, better server selection strategies, and more advanced techniques for efficient interference management.

A pico eNB, such as the pico eNB 110x, is characterized by a substantially lower transmit power when compared with a macro eNB, such as the macro eNBs 110a-c. A pico eNB will also usually be placed around a network, such as the wireless network 100, in an ad hoc manner. Because of this unplanned deployment, wireless networks with pico eNB placements, such as the wireless network 100, can be expected to have large areas with low signal to interference conditions, which can make for a more challenging RF environment for control channel transmissions to UEs on the edge of a coverage area or cell (a "cell-edge" UE). Moreover, the potentially large disparity (e.g., approximately 20 dB) between the transmit power levels of the macro eNBs 110a-c and the pico eNB 110x implies that, in a mixed deployment, the downlink coverage area of the pico eNB 110x will be much smaller than that of the macro eNBs 110a-c.

In the uplink case, however, the signal strength of the uplink signal is governed by the UE, and, thus, will be similar when received by any type of the eNBs 110. With the uplink coverage areas for the eNBs 110 being roughly the same or similar, uplink handoff boundaries will be determined based on channel gains. This can lead to a mismatch between downlink handover boundaries and uplink handover boundaries. Without additional network accommodations, the mismatch would make the server selection or the association of UE to eNB more difficult in the wireless network 100 than in a macro eNB-only homogeneous network, where the downlink and uplink handover boundaries are more closely matched.

If server selection is based predominantly on downlink received signal strength, the usefulness of mixed eNB deployment of heterogeneous networks, such as the wireless network 100, will be greatly diminished. This is because the larger coverage area of the higher powered macro eNBs, such as the macro eNBs 110a-c, limits the benefits of splitting the cell coverage with the pico eNBs, such as the pico eNB 110x, because, the higher downlink received signal strength of the macro eNBs 110a-c will attract all of the available UEs, while the pico eNB 110x may not be serving any UE because of its much weaker downlink transmission power. Moreover, the macro eNBs 110a-c will likely not have sufficient resources to efficiently serve those UEs. Therefore, the wireless network 100 will attempt to actively balance the load between the macro eNBs 110a-c and the pico eNB 110x by expanding the coverage area of the pico eNB 110x. This concept is referred to as range extension.

The wireless network 100 achieves this range extension by changing the manner in which server selection is determined. Instead of basing server selection on downlink received signal strength, selection is based more on the quality of the downlink signal. In one such quality-based determination, server selection may be based on determining the eNB that offers the minimum path loss to the UE. Additionally, the wireless network 100 may partition resources between the macro eNBs 110a-c and the pico eNB 110x. However, even with this active balancing of load, downlink interference from the macro eNBs 110a-c should be mitigated for the UEs served by the pico eNBs, such as the pico eNB 110x. This can be accomplished by various methods, including interference cancellation at the UE, resource coordination among the eNBs 110, or the like.

In a heterogeneous network with range extension, such as the wireless network 100, in order for UEs to obtain service from the lower-powered eNBs, such as the pico eNB 110x, in the presence of the stronger downlink signals transmitted from the higher-powered eNBs, such as the macro eNBs 110a-c, the pico eNB 110x engages in control channel and data channel interference coordination with the dominant interfering macro eNBs 110a-c. Different techniques for interference coordination may be employed to manage interference. For example, inter-cell interference coordination (ICIC) may be used to reduce interference from cells in co-channel deployment. One ICIC mechanism is adaptive resource partitioning. Adaptive resource partitioning assigns subframes to certain eNBs. In subframes assigned to a first eNB, neighbor eNBs do not transmit. Thus, interference experienced by a UE served by the first eNB is reduced. Subframe assignment may be performed on both the uplink and downlink channels.

For example, subframes may be allocated between three classes of subframes: protected subframes (U subframes), prohibited subframes (N subframes), and common subframes (C subframes). Protected subframes are assigned to a first eNB for use exclusively by the first eNB. Protected subframes may also be referred to as "clean" subframes based on the lack of interference from neighboring eNBs. Prohibited subframes are subframes assigned to a neighbor eNB, and the first eNB is prohibited from transmitting data during the prohibited subframes. For example, a prohibited subframe of the first eNB may correspond to a protected subframe of a second interfering eNB. Thus, the first eNB is the only eNB transmitting data during the first eNB's protected subframe. Common subframes may be used for data transmission by multiple eNBs. Common subframes may also be referred to as "unclean" subframes because of the possibility of interference from other eNBs.

At least one protected subframe is statically assigned per period. In some cases only one protected subframe is statically assigned. For example, if a period is 8 milliseconds, one protected subframe may be statically assigned to an eNB during every 8 milliseconds. Other subframes may be dynamically allocated.

Adaptive resource partitioning information (ARPI) allows the non-statically assigned subframes to be dynamically allocated. Any of protected, prohibited, or common subframes may be dynamically allocated (AU, AN, AC subframes, respectively). The dynamic assignments may change quickly, such as, for example, every one hundred milliseconds or less.

Heterogeneous networks may have eNBs of different power classes. For example, three power classes may be defined, in decreasing power class, as macro eNBs, pico eNBs, and femto eNBs. When macro eNBs, pico eNBs, and femto eNBs are in a co-channel deployment, the power spectral density (PSD) of the macro eNB (aggressor eNB) may be larger than the PSD of the pico eNB and the femto eNB (victim eNBs) creating large amounts of interference with the pico eNB and the femto eNB. Protected subframes may be used to reduce or minimize interference with the pico eNBs and femto eNBs. That is, a protected subframe may be scheduled for the victim eNB to correspond with a prohibited subframe on the aggressor eNB.

Figure 4:
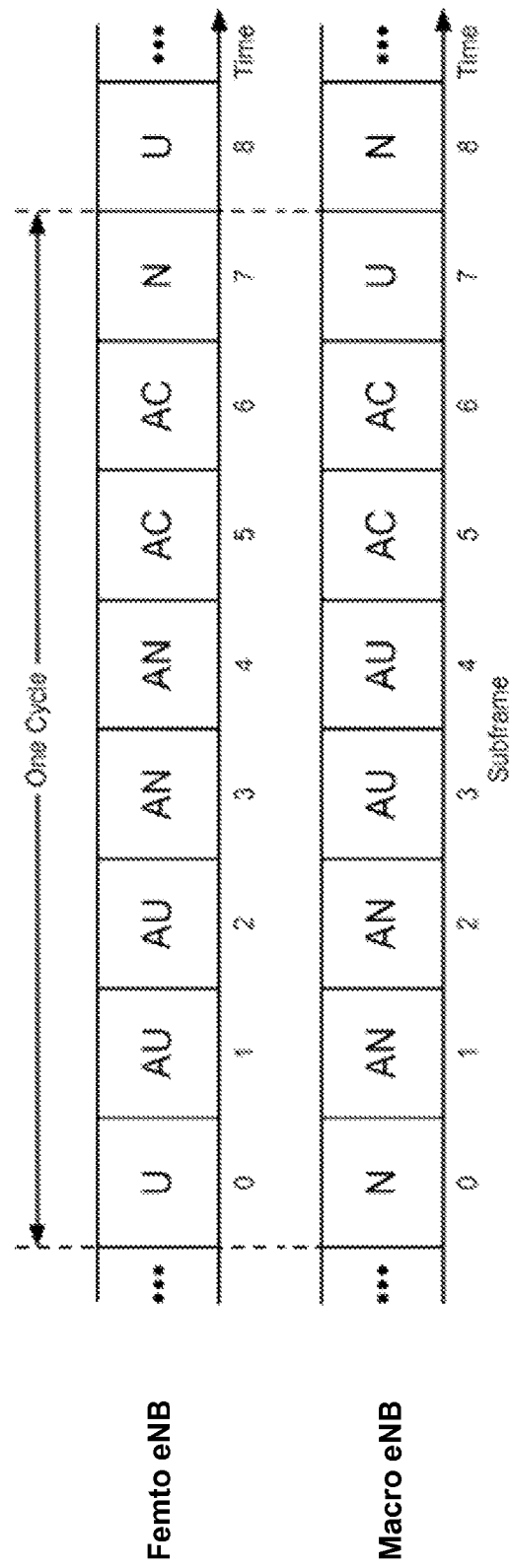
FIG. 4 is a block diagram conceptually illustrating time division multiplexed (TDM) partitioning in a heterogeneous network according to one aspect of the disclosure.

FIG. 4 is a block diagram illustrating time division multiplexed (TDM) partitioning in a heterogeneous network according to one aspect of the disclosure. A first row of blocks illustrate subframe assignments for a femto eNB, and a second row of blocks illustrate subframe assignments for a macro eNB. Each of the eNBs has a static protected subframe during which the other eNB has a static prohibited subframe. For example, the femto eNB has a protected subframe (U subframe) in subframe 0 corresponding to a prohibited subframe (N subframe) in subframe 0. Likewise, the macro eNB has a protected subframe (U subframe) in subframe 7 corresponding to a prohibited subframe (N subframe) in subframe 7. Subframes 1-6 are dynamically assigned as either protected subframes (AU), prohibited subframes (AN), and common subframes (AC). During the dynamically assigned common subframes (AC) in subframes 5 and 6, both the femto eNB and the macro eNB may transmit data.

Protected subframes (such as U/AU subframes) have reduced interference and a high channel quality because aggressor eNBs are prohibited from transmitting. Prohibited subframes (such as N/AN subframes) have no data transmission to allow victim eNBs to transmit data with low interference levels. Common subframes (such as C/AC subframes) have a channel quality dependent on the number of neighbor eNBs transmitting data. For example, if neighbor eNBs are transmitting data on the common subframes, the channel quality of the common subframes may be lower than the protected subframes. Channel quality on common subframes may also be lower for extended boundary area (EBA) UEs strongly affected by aggressor eNBs. An EBA UE may belong to a first eNB but also be located in the coverage area of a second eNB. For example, a UE communicating with a macro eNB that is near the range limit of a femto eNB coverage is an EBA UE.

In deployments of heterogeneous networks, such as the wireless network 100, a UE may operate in a dominant interference scenario in which the UE may observe high interference from one or more interfering eNBs. A dominant interference scenario may occur due to restricted association. For example, in FIG. 1, the UE 120y may be close to the femto eNB 110y and may have high received power for the eNB 110y. However, the UE 120y may not be able to access the femto eNB 110y due to restricted association and may then connect to the macro eNB 110c (as shown in FIG. 1) or to the femto eNB 110z also with lower received power (not shown in FIG. 1). The UE 120y may then observe high interference from the femto eNB 110y on the downlink and may also cause high interference to the eNB 110y on the uplink. Using coordinated interference management, the eNB 110c and the femto eNB 110y may communicate over the backhaul 134 to negotiate resources. In the negotiation, the femto eNB 110y agrees to cease transmission on one of its channel resources, such that the UE 120y will not experience as much interference from the femto eNB 110y as it communicates with the eNB 110c over that same channel.

Figure 5:
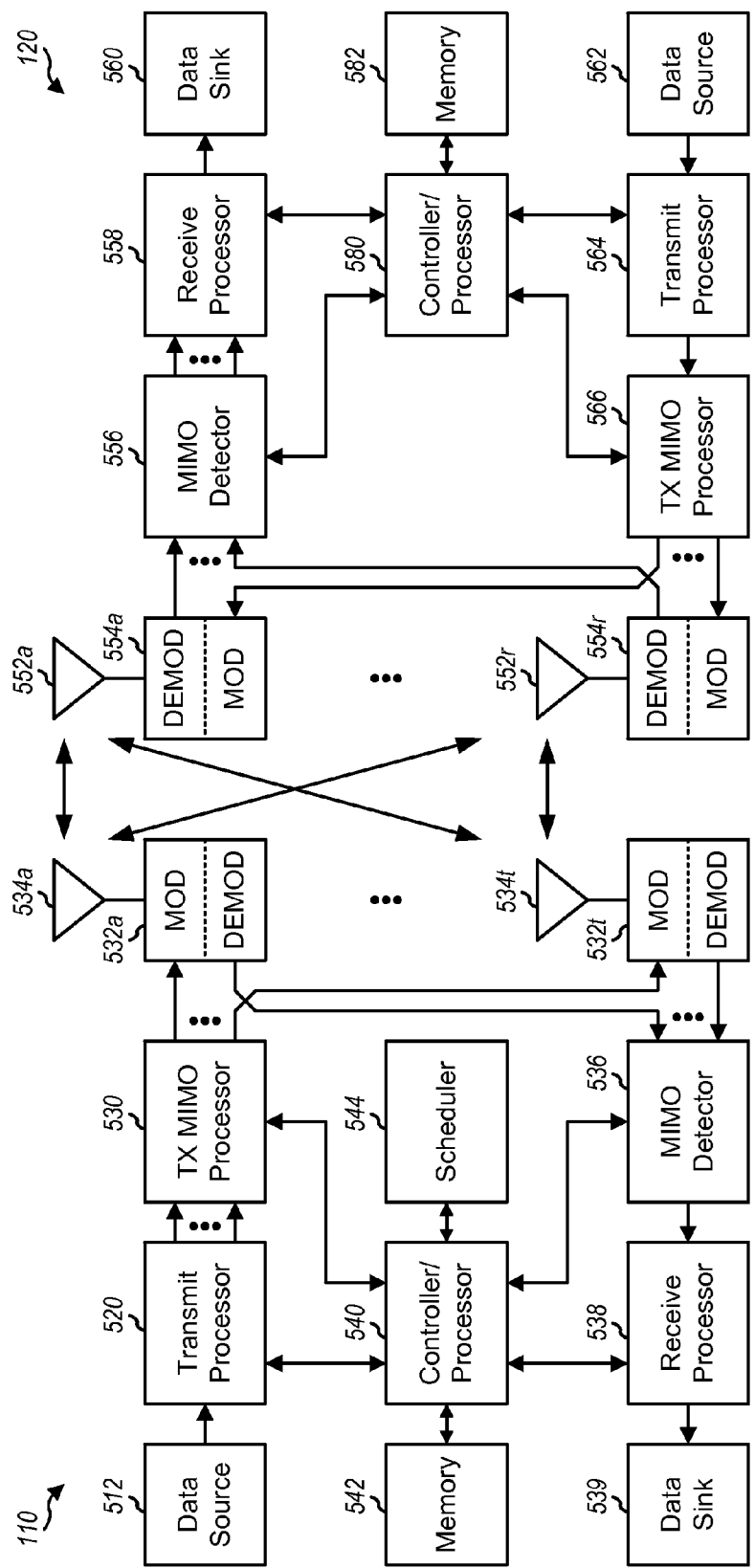
FIG. 5 is a block diagram conceptually illustrating a design of a base station/eNB and a UE configured according to one aspect of the present disclosure.

FIG. 5 shows a block diagram of a design of a base station/eNB 110 and a UE 120, which may be one of the base stations/eNBs and one of the UEs in FIG. 1. For a restricted association scenario, the eNB 110 may be the macro eNB 110c in FIG. 1, and the UE 120 may be the UE 120y. The eNB 110 may also be a base station of some other type. The eNB 110 may be equipped with antennas 534a through 534t, and the UE 120 may be equipped with antennas 552a through 552r.

At the eNB 110, a transmit processor 520 may receive data from a data source 512 and control information from a controller/processor 540. The control information may be for the PBCH, PCFICH, PHICH, PDCCH, etc. The data may be for the PDSCH, etc. The transmit processor 520 may process (e.g., encode and symbol map) the data and control information to obtain data symbols and control symbols, respectively. The transmit processor 520 may also generate reference symbols, e.g., for the PSS, SSS, and cell-specific reference signal. A transmit (TX) multiple-input multiple-output (MIMO) processor 530 may perform spatial processing (e.g., precoding) on the data symbols, the control symbols, and/or the reference symbols, if applicable, and may provide output symbol streams to the modulators (MODs) 532a through 532t. Each modulator 532 may process a respective output symbol stream (e.g., for OFDM, etc.) to obtain an output sample stream. Each modulator 532 may further process (e.g., convert to analog, amplify, filter, and upconvert) the output sample stream to obtain a downlink signal. Downlink signals from modulators 532a through 532t may be transmitted via the antennas 534a through 534t, respectively.

At the UE 120, the antennas 552a through 552r may receive the downlink signals from the eNB 110 and may provide received signals to the demodulators (DEMODs) 554a through 554r, respectively. Each demodulator 554 may condition (e.g., filter, amplify, downconvert, and digitize) a respective received signal to obtain input samples. Each demodulator 554 may further process the input samples (e.g., for OFDM, etc.) to obtain received symbols. A MIMO detector 556 may obtain received symbols from all the demodulators 554a through 554r, perform MIMO detection on the received symbols if applicable, and provide detected symbols. A receive processor 558 may process (e.g., demodulate, deinterleave, and decode) the detected symbols, provide decoded data for the UE 120 to a data sink 560, and provide decoded control information to a controller/processor 580.

On the uplink, at the UE 120, a transmit processor 564 may receive and process data (e.g., for the PUSCH) from a data source 562 and control information (e.g., for the PUCCH) from the controller/processor 580. The processor 564 may also generate reference symbols for a reference signal. The symbols from the transmit processor 564 may be precoded by a TX MIMO processor 566 if applicable, further processed by the demodulators 554a through 554r (e.g., for SC-FDM, etc.), and transmitted to the eNB 110. At the eNB 110, the uplink signals from the UE 120 may be received by the antennas 534, processed by the modulators 532, detected by a MIMO detector 536 if applicable, and further processed by a receive processor 538 to obtain decoded data and control information sent by the UE 120. The receive processor 538 may provide the decoded data to a data sink 539 and the decoded control information to the controller/processor 540.

The controllers/processors 540 and 580 may direct the operation at the eNB 110 and the UE 120, respectively. The controller/processor 540 and/or other processors and modules at the eNB 110 may perform or direct the execution of various processes for the techniques described herein. The controller/processor 580 and/or other processors and modules at the UE 120 may also perform or direct the execution of the functional blocks illustrated in FIGS. 4 and 5, and/or other processes for the techniques described herein. The memories 542 and 582 may store data and program codes for the eNB 110 and the UE 120, respectively. A scheduler 544 may schedule UEs for data transmission on the downlink and/or uplink.

As referenced above, certain resource blocks, as well as certain resource elements with resource blocks may be dedicated for special signals such as synchronization signals, reference signals, control signals and broadcast system information. For example, three synchronization steps in LTE/-A are: symbol timing acquisition, carrier frequency synchronization, and sampling clock synchronization. In one example, LTE/-A uses the PSS and the SSS for time and frequency synchronization and for broadcasting of certain system parameters such as cell identification, cyclic prefix length, duplex method, etc. The PSS is usually detected by the UE first, followed by SSS detection.

In general, the PSS is detected non-coherently (i.e., detection without phase information) by the UE since there is assumed to be no a priori channel information available to the UE. Because the SSS is detected after detection of the PSS, if channel state information (CSI) is available to the UE after PSS detection, then coherent detection (i.e., detection with phase information) of the SSS may be available, otherwise, non-coherent detection of the SSS will be used, for example, in the case of coherent interference from neighboring eNodeBs.

When a UE enters a particular LTE/-A cell and attempts to access the cell, it would use system access information, contained within a system information block (SIB) before starting the RACH procedure, whether it is accessing for connected-mode or for camping to a cell in idle mode. In UMTS Rel-8, a UE begins the RACH procedure by detecting the PSS/SSS signals for synchronization, for example, to determine the physical layer cell identifier and frame timing within the cell. The UE would then also read the PBCH for system bandwidth information, Physical HARQ Indicator Channel (PHICH) duration information, and system frame number (SFN) information. The synchronization and other system access information and parameters obtained by the UE from the PSS, SSS, and PBCH are referred to herein collectively as synchronization parameters. Next, after synchronizing with the network, the UE would attempt to decode control information for SIB1, which is carried in the PDSCH. This control information includes both the PCFICH and the PDCCH.

However in heterogeneous LTE-A networks, a UE may benefit from reading SIB from a weaker cell where the signal-to-noise ratio (SNR) may be lower, in order to obtain better system performance. For example, the UE may not be allowed to access a strong cell like a closed subscriber group (CSG) cell or a cell that has been barred for the UE to access during a connected mode, or the UE may be ordered to hand over to a weaker cell for system load balancing. In these examples, the UE may use interference cancellation to detect the requisite synchronization parameters in the PSS, SSS, and PBCH of the weaker cell. For SIB1 or other SIBs decoding, it may be challenging since the UE would first read PCFICH and PDCCH in order to decode SIB1 or SIBs.

Figure 6:
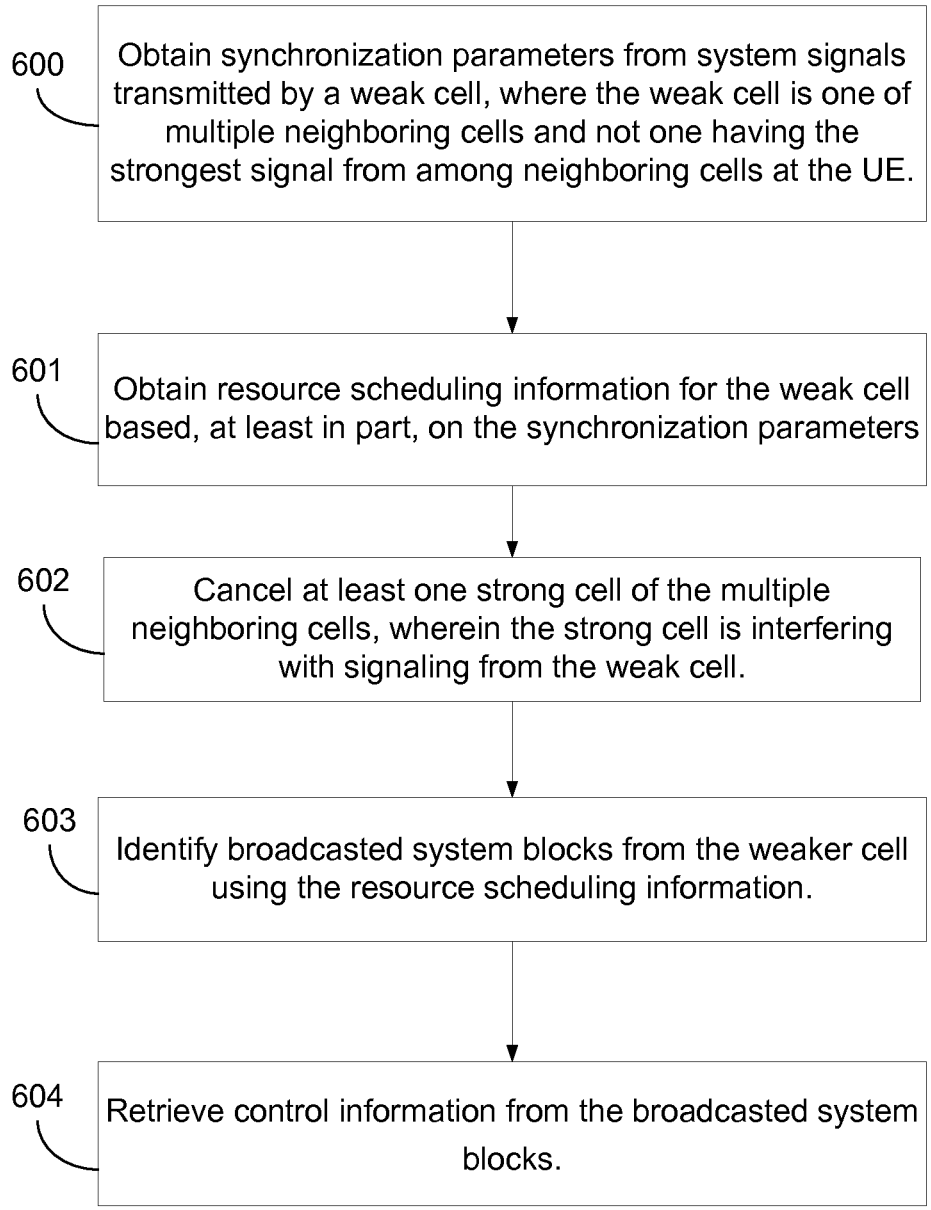
FIG. 6 is a functional block diagram illustrating example blocks executed to implement one aspect of the present disclosure.

FIG. 6 is a functional block diagram illustrating example blocks executed to implement one aspect of the present disclosure. In block 600, synchronization parameters are obtained from system signals transmitted by a weak cell, where the weak cell is one of multiple neighboring cells and does not have the strongest signal from among the neighboring cells at the UE. In obtaining access to the system signals, the UE may either perform interference cancellation of PSS/SSS/PBCH, use a positional cell search by leveraging position reference signals (PRS), or some combination of both.

In block 601, the UE obtains resource scheduling information for the weak cell based, at least in part, on the synchronization parameters. In order to gain access to the appropriate system signals carrying the resource scheduling information, the UE would use the synchronization parameters to synchronize itself with the cell. The UE may, in fact, obtain this resource scheduling information in the form of TDM subframe partition information decoded from the SIBs of one of the stronger neighbor cells. Alternatively, in network implementations that support an evolved PBCH (ePBCH), extra bits in the payload of the PBCH may be used to identify a dedicated resource where the UE can obtain access without experiencing strong interference. The resource identification information of this dedicated resource provides the appropriate resource scheduling information to the UE.

In block 602, the UE cancels at least one strong cell of neighboring cells, wherein the canceled strong cell is barred from access by the UE. In block 603, using the resource scheduling information, the UE identifies the broadcasted system blocks, such as the SIB1, other SIBs, etc., from the weaker cell. Once identified, then, in block 604, the UE can decode the broadcasted system blocks to retrieve the control information it will use to complete initial random access to the weaker cell.

In the detail of the various implementations of this initial network access procedure, multiple different process blocks may be used and grouped together as building blocks for each implementation. For example, in many of the implementations configured according to the present disclosure, PSS interference cancellation is performed. Here, the UE cancels the PSS signal or signals from the stronger cells in order to locate the PSS signals in the additional weaker cells. This PSS interference cancellation also provides a reduction of interference to other channels or signals, for example, reducing the interference to the SSS symbol caused by the delay spread.

Another available procedure is SSS interference cancellation. As with the PSS cancellation, the UE cancels the SSS signal from each of the stronger cells in order to locate the SSS signal of the weaker cell. SSS interference cancellation also provides a reduction of interference to other channels or signals, for example, reducing the interference to the PSS symbol also caused by the delay spread.

In order to obtain additional synchronization parameters, the UE may also perform PBCH interference cancellation. For example, the UE may cancel the PBCH and CRS signals from the stronger cells in order to find and decode the PBCH for the weaker cells. This interference cancellation process will also generally reduce interference to other channels or signals, for example, reducing the interference to the CRS of the weaker cell.

The individual processes of PSS, SSS, and PBCH interference cancellation performed together allow the UE to obtain the various synchronization parameters. An alternative process that may either be performed as an alternative to PSS/SSS/PBCH interference cancellation or in addition thereto is a position location cell search. PRS signals are signals that may be used to locate various cells. A UE may use PRS to locate additional weaker cells if there is good coordination of PRS signal transmissions from the different cells.

Another process block that may be used in the initial access procedure is the cross-subframe signaling of PCFICH and PDCCH. In order to implement this process block, the cells broadcast the control information for PDSCH on a different subframe than where PDSCH is transmitted. The UE will generally use buffered control information in order to decode the PDSCH.

The initial access procedure may also use a PDCCH-less operation. Instead of the UE detecting, accessing, and decoding the PDCCH, the cell pre-defines PDSCH control information so that the UE can directly decode the PDSCH without first decoding its control information from PDCCH.

The initial access procedure may also use a coordinated and dedicated resources for control information and data. In this process block, the cell reserves a dedicated resource to transmit control information and/or data, such as PDFICH/PDCCH for SIB1/SIBs. This dedicated resource may be reserved from the data region of a regular subframe, from an MBSFN-type subframe, or the like. The neighboring cells coordinate these dedicated resources over the backhaul so that the UE will not experience strong interference when accessing those resources. Examples of such dedicated resources include the R-PDCCH and R-PDSCH. In practice, the cell may transmit the control information for the SIB1/SIBs in the dedicated resource location while still transmitting the SIB1/SIBs at the standard location. Alternatively, the cell may transfer the SIB1/SIB information in the dedicated resources in addition to the control information. In such an alternative embodiment, the SIB1/SIBs sent in the dedicated resources are in addition to the SIB1/SIBs transmitted in the standard location for backward compatibility purposes.

Another process block that may be used in the initial access procedure uses the ePBCH, in which reserved bits of the ePBCH payload identify the dedicated resource defined above. Therefore, the UE would obtain the location of this dedicated resource by reading the reserved bits of the PBCH payload.

In a heterogeneous network in which multiple cells may serve the same geographic location, TDM partitioning may be used to establish a subframe mapping for the multiple cells. This partitioning may allow weaker cells use of certain subframes without interference from surrounding, stronger cells. In the processing block for the initial access procedure, the UE would obtain this TDM partitioning information in order to obtain identification of at least one subframe that is being used by the weaker cell to serve at least one of its UEs. Access to such subframes provide the UE an access point to the weaker cell without too much interference.

In still another process block that may be used in the initial access procedure, the UE may perform interference cancellation of the PDSCH. Similar to the interference cancellations of PSS/SSS/PBCH, the UE cancels the PDSCH from the stronger, interfering cells to obtain access to the PDSCH of the weaker cell.

Figure 7A:
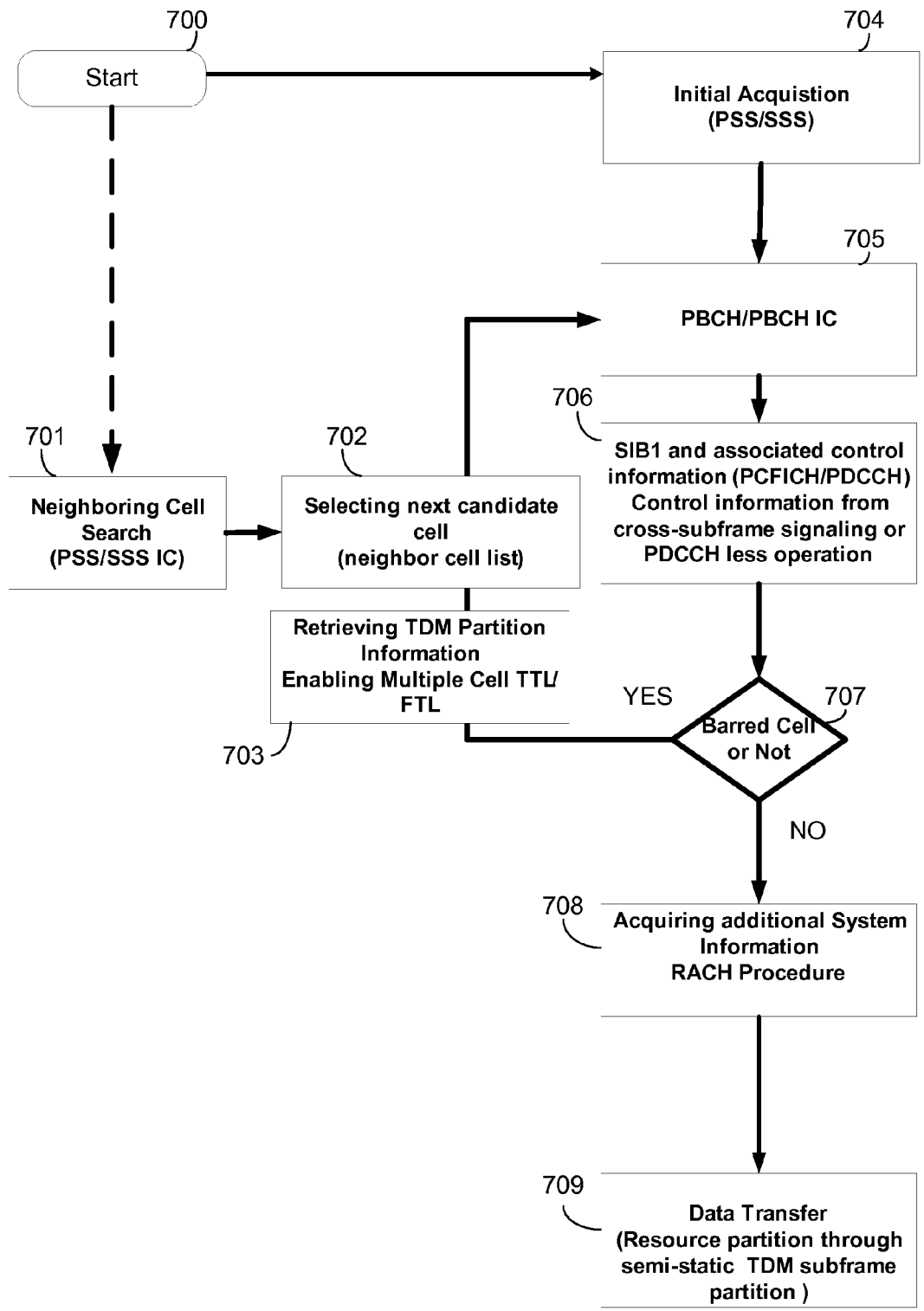
FIGS. 7A-7D are a functional block diagrams illustrating example blocks executed to implement alternative aspects of the present disclosure.

As described, each of these various process blocks may be used or combined in different ways as building blocks for the various implementations of the present disclosure. Each such aspect of implementation facilitates the UE access to a weaker cell of multiple neighboring cells. FIG. 7A is a functional block diagram illustrating example blocks executed to implement one aspect of the present disclosure. In block 700, a UE attempts to access a heterogeneous network; thus, beginning the initial access procedure. In block 701, the UE searches for a weaker neighboring cell by performing PSS/SSS/PBCH cancellation. The UE cancels the PSS/SSS/PBCH of the stronger cells. As each new cell is discovered, the UE obtains the synchronization parameters by acquiring the PSS/SSS, in block 704, and by acquiring the PBCH, in block 705. The UE then obtains the SIB1 and associated control information from the PCFICH/PDCCH, where the control information may be obtained using any number of processes, such as cross-subframe signaling, a PDCCH-less operation, or the like, in block 706. With this control information, a determination is made, in block 707, whether the current cell is prohibited or barred from access by the UE.

If the current cell is barred from access by the UE, the TDM partition information is retrieved, in block 703, which provides the UE the partitioning information for the multiple neighboring cells as well, and the UE selects the next cell candidate, in block 702, from the neighbor cell list compiled in block 701. Because the synchronization information portion of the synchronization parameters was obtained in the initial acquisition of PSS/SSS in block 704, this block will not be re-executed, as the synchronization information will remain the same. Instead, acquisition of the PBCH of the new cell is performed at block 705. The new SIB1 and control information are obtained, in block 706, after which the determination of block 707 is again performed to determine whether the UE can access the current cell. This process is repeated until a cell is found that the UE may access. If the determination of block 707 indicates that the current cell is not barred from access, then, in block 708, the UE acquires the additional system information for the RACH procedure. In block 709, after accessing the current cell, data transfer to the UE may occur through the semi-static TDM subframe partition resourced by the cell.

Figure 7B:
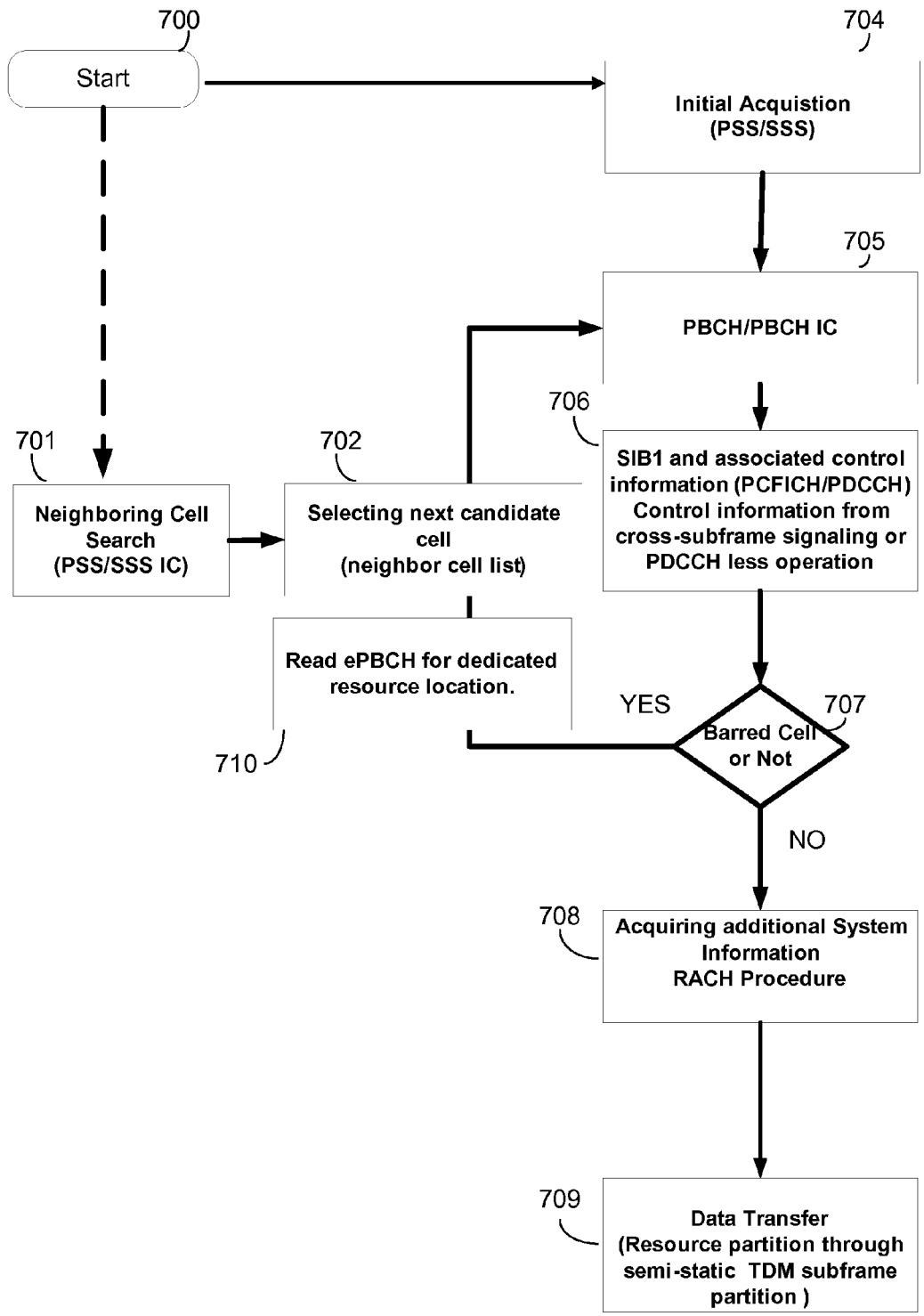

FIG. 7B is a functional block diagram illustrating example blocks executed to implement one aspect of the present disclosure. The random access procedure illustrated in FIG. 7B includes many of the same process blocks as illustrated in the alternative procedure of FIG. 7A. The UE begins the access procedure at block 700, performs the neighbor cell search using PSS/SSS/PBCH interference cancellation in block 701, initially acquires the current cell's PSS/SSS in block 704, obtains the PBCH in block 705, obtains SIB1 and control information in block 706, and determines whether the current cell is barred from access by the UE in block 707. However, in the alternative aspect illustrated in FIG. 7B, the UE reads the additional bits of the cells ePBCH, in block 710, to receive the location of the dedicated resource. In this aspect of the access process, the UE does not obtain the TDM partition information in order to identify the subframe partitioning of the network region. The remaining procedure continues as before, with the initial access process being repeated until the appropriate cell is found by selecting the next candidate cell from the neighbor cell list in block 702, acquiring the new cell's PBCH in block 705, obtaining the SIB1 and control information in block 706, and determining if the new cell is prohibited from access in block 707. When the appropriate cell is found, the UE obtains the additional system information to complete the RACH procedure in block 708, and then begins data transfer, in block 709, over the appropriate subframe partition.

Figure 7C:
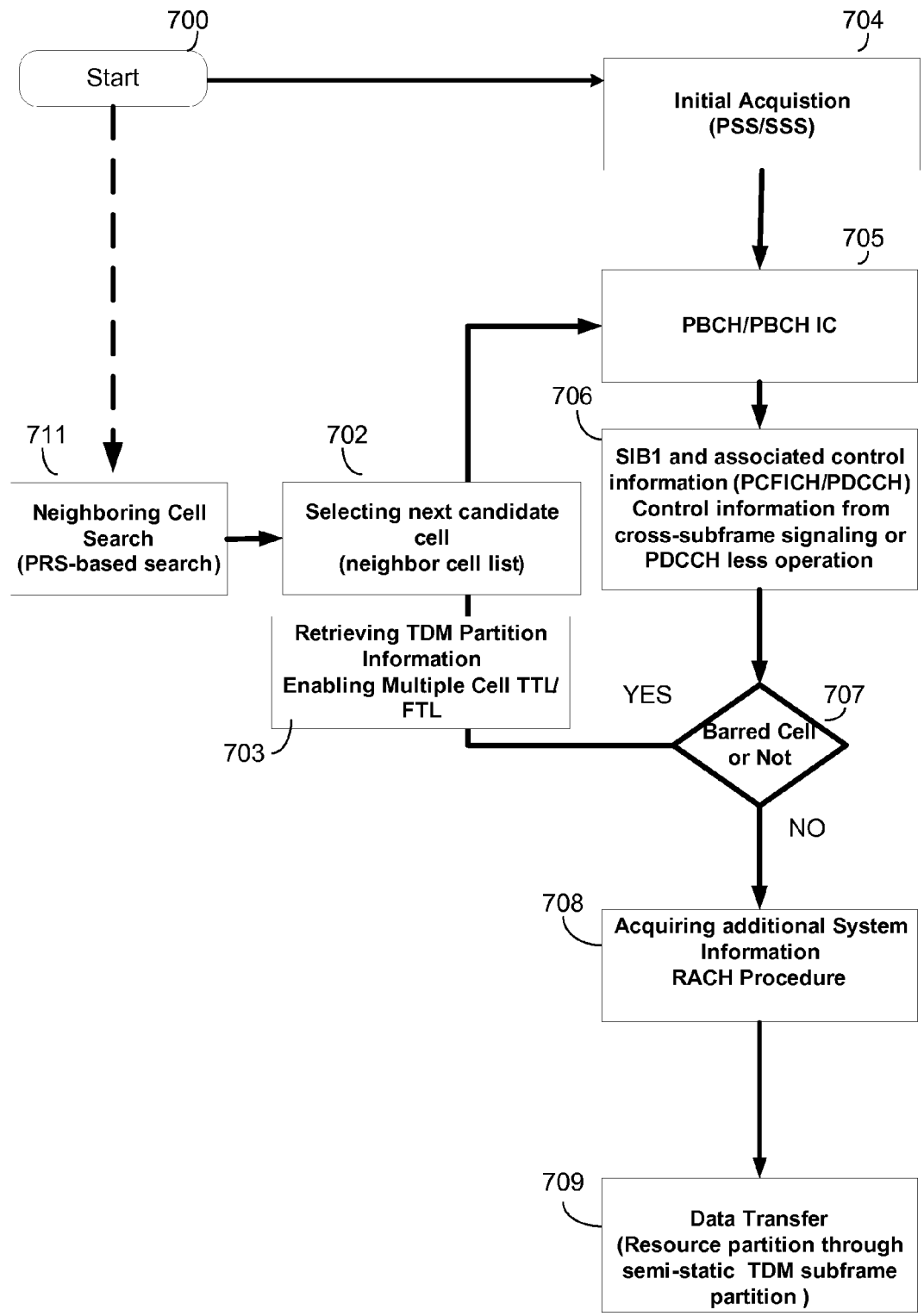

FIG. 7C is a functional block diagram illustrating example blocks executed to implement one aspect of the present disclosure. Again, the random access procedure illustrated in FIG. 7C includes many of the same process blocks as illustrated in the alternative procedures of FIGS. 7A and 7B. The UE begins the access procedure at block 700 and performs the neighbor cell search in block 701. However, instead of searching the neighbor cells using PSS/SSS/PBCH interference cancellation, the UE uses available PRS signals to identify the neighboring cells by location information in block 711. The remaining access procedure is similar to the previously-described alternative procedures in which the UE initially acquires the current cell's PSS/SSS in block 704, obtains the PBCH in block 705, obtains SIB1 and control information in block 706, and determines whether the current cell is prohibited from access by the UE in block 707. If the current cell is prohibited from access by the UE, the TDM partition information is retrieved, in block 703, which provides the UE the partitioning information for the multiple neighboring cells as well, and the UE selects the next cell candidate, in block 702. The remaining procedure continues as before, with the initial access process being repeated until the appropriate cell is found by acquiring the new cell's PBCH in block 705, obtaining the SIB1 and control information in block 706, and determining if the new cell is prohibited from access in block 707. When the appropriate cell is found, the UE obtains the additional system information to complete the RACH procedure in block 708, and then begins data transfer, in block 709, over the appropriate subframe partition.

Figure 7D:
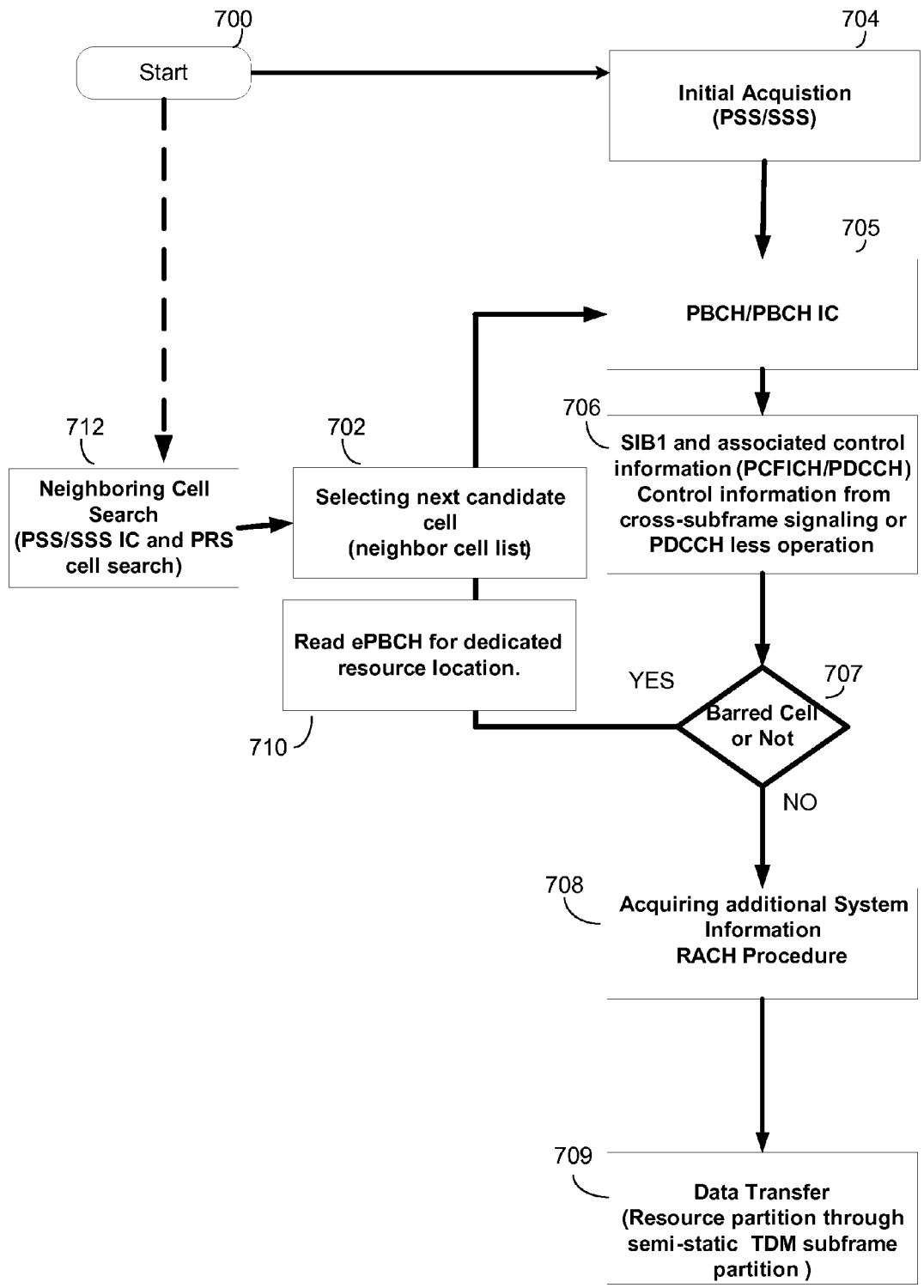

FIG. 7D is a functional block diagram illustrating example blocks executed to implement one aspect of the present disclosure. As before, the random access procedure illustrated in FIG. 7D includes many of the same process building blocks as illustrated in the alternative procedures of FIGS. 7A-7C. The UE begins the access procedure at block 700 and performs the neighbor cell search in block 701. However, the UE searches for the neighbor cells using both PSS/SSS/PBCH interference cancellation and the available PRS signals to identify the neighboring cells in block 712. The next procedures are similar to the previously-described alternative procedures in which the UE initially acquires the current cell's PSS/SSS in block 704, obtains the PBCH in block 705, obtains SIB1 and control information in block 706, and determines whether the current cell is prohibited from access by the UE in block 707. If the current cell is prohibited from access by the UE, the UE reads the additional bits of the ePBCH, in block 710, to receive the location of the dedicated resource. The remaining procedure continues as before, with the initial access process being repeated until the appropriate cell is found by selecting the next candidate cell from the neighbor cell list in block 702, acquiring the new cell's PBCH in block 705, obtaining the SIB1 and control information in block 706, and determining if the new cell is barred from access in block 707. When the appropriate cell is found, the UE obtains the additional system information to complete the RACH procedure in block 708, and then begins data transfer, in block 709, over the appropriate subframe partition.

In one configuration, the UE 120 configured for wireless communication includes means for obtaining synchronization parameters from system signals transmitted by a weaker cell of a plurality of neighboring cells, means for obtaining resource scheduling information for the weaker cell, wherein the resource scheduling information indicates at least one resource designated for use by at least one other UE served by the weaker cell, and where the means for obtaining the resource scheduling information, at least in part, use the synchronization parameters. The UE 120 also includes means for identifying broadcasted system blocks for the weaker cell using the resource scheduling information and means for retrieving control information by from the broadcasted system blocks. In one aspect, the aforementioned means may be the processor(s), the controller/processor 580, the memory 582, the receive processor 558, the MIMO detector 556, the demodulators 554a, and the antennas 552a configured to perform the functions recited by the aforementioned means. In another aspect, the aforementioned means may be a module or any apparatus configured to perform the functions recited by the aforementioned means.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The functional blocks and modules in FIGS. 6 and 7A-7D may comprise processors, electronics devices, hardware devices, electronics components, logical circuits, memories, software codes, firmware codes, etc., or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication for acquiring control information for performing a Random Access Channel Procedure (RACH) at a user equipment (UE), comprising:
   obtaining resource scheduling information for an access point of a weak cell from a transmission transmitted by another access point of at least one other cell of a plurality of neighboring cells, said at least one other cell being barred from access by said UE, said weak cell being one of said plurality of neighboring cells and not having a strongest signal from among said plurality of neighboring cells at said UE, and said transmission containing the resource scheduling information for a broadcast transmission from the weak cell;
   identifying broadcasted system blocks from said weak cell using said resource scheduling information;
   retrieving control information from said broadcasted system blocks;
   performing the RACH procedure with the weak cell based on said control information; and
   determining that the at least one other cell is barred from access by said UE,
   wherein said obtaining resource scheduling information for said access point of said weak cell is performed in response to said determining that the at least one other cell is barred from access by said UE.

2. The method of claim 1 wherein said obtaining resource scheduling information comprises: decoding time division multiplex (TDM) subframe partition information from a system information block (SIB) of at least one stronger cell from said plurality of neighboring cells, wherein said resource scheduling information comprises said decoded TDM subframe partition information.

3. The method of claim 1 wherein said obtaining said resource scheduling information comprises: reading a dedicated resource identification from a plurality of bits in an evolved broadcast channel of one of said plurality of neighboring cells, wherein said resource scheduling information is obtained using said dedicated resource identification.

4. The method of claim 1 wherein said resource scheduling information indicates at least one resource designated for use by a second UE, said second UE being served by said weak cell.

5. A user equipment (UE) configured for wireless communication for acquiring control information for performing a Random Access Channel Procedure (RACH) at the UE, comprising:
   means for obtaining resource scheduling information for an access point of a weak cell from a transmission transmitted by another access point of at least one other cell of a plurality of neighboring cells, said at least one other cell being barred from access by said UE, said weak cell being one of said plurality of neighboring cells and not having a strongest signal from among said plurality of neighboring cells at said UE, and said transmission containing the resource scheduling information for a broadcast transmission from the weak cell;
   means for identifying broadcasted system blocks from said weak cell using said resource scheduling information;

means for retrieving control information from said broadcasted system blocks;
means for performing the RACH procedure with the weak cell based on said control information; and
means for determining that the at least one other cell is barred from access by said UE,
wherein said means for obtaining resource scheduling information for said access point of said weak cell is responsive to said means for determining that the at least one other cell is barred from access by said UE.

6. The UE of claim 5 wherein said means for obtaining resource scheduling information comprises: means for decoding time division multiplex (TDM) subframe partition information from a system information block (SIB) of at least one stronger cell of said plurality of neighboring cells, wherein said resource scheduling information comprises said decoded TDM subframe partition information.

7. The UE of claim 5 wherein said means for obtaining said resource scheduling information comprises: means for reading a dedicated resource identification from a plurality of bits in an evolved broadcast channel of one of said plurality of neighboring cells, wherein said resource scheduling information is obtained using said dedicated resource identification.

8. The UE of claim 5 wherein said resource scheduling information indicates at least one resource designated for use by a second UE, said second UE being served by said weak cell.

9. A computer program product for wireless communications in a wireless network for acquiring control information for performing a Random Access Channel Procedure (RACH) at a user equipment (UE), comprising:
a non-transitory computer-readable medium having program code recorded thereon, that when executed a processor, cause the processor to:
program code to obtain resource scheduling information for an access point of a weak cell from a transmission transmitted by another access point of at least one other cell of a plurality of neighboring cells, said at least one other cell being barred from access by said UE, said weak cell being one of said plurality of neighboring cells and not having a strongest signal from among said plurality of neighboring cells at said UE, and said transmission containing the resource scheduling information for a broadcast transmission from the weak cell;
program code to identify broadcasted system blocks from said weak cell using said resource scheduling information;
program code to retrieve control information from said broadcasted system blocks;
program code to perform the RACH procedure with the weak cell based on the control information; and
wherein said program code further comprises:
code to determine that the at least one other cell is barred from access by said UE,
wherein said code to obtain resource scheduling information for said access point of said weak cell is responsive to said code to determine that the at least one other cell is barred from access by said UE.

10. The computer program product of claim 9 wherein said program code to obtain resource scheduling information comprises: program code to decode time division multiplex (TDM) subframe partition information from a system information block (SIB) of at least one stronger cell of said plurality of neighboring cells, wherein said resource scheduling information comprises said decoded TDM subframe partition information.

11. The computer program product of claim 9 wherein said program code to obtain said resource scheduling information comprises: program code to read a dedicated resource identification from a plurality of bits in an evolved broadcast channel of one of said plurality of neighboring cells, wherein said resource scheduling information is obtained using said dedicated resource identification.

12. The computer program product of claim 9 wherein said resource scheduling information indicates at least one resource designated for use by a second UE, said second UE being served by said weak cell.

13. A user equipment (UE) configured for wireless communication for acquiring control information for performing a Random Access Channel Procedure (RACH) at the UE, comprising
at least one processor; and
a memory coupled to said at least one processor,
wherein said at least one processor is configured to:
obtain resource scheduling information for an access point of a weak cell from a transmission transmitted by another access point of at least one other cell of a plurality of neighboring cells, said at least one other cell being barred from access by said UE, said weak cell being one of said plurality of neighboring cells and not having a strongest signal from among said plurality of neighboring cells at said UE, and said transmission containing the resource scheduling information for a broadcast transmission from the weak cell;
identify broadcasted system blocks from said weak cell using said resource scheduling information;
retrieve control information from said broadcasted system blocks;
perform the RACH procedure with the weak cell based on the control information; and
wherein said at least one processor is further configured to:
determine that the at least one other cell is barred from access by said UE,
wherein said at least one processor is configured to obtain said resource scheduling information for said access point of said weak cell in response to determining that the at least one other cell is barred from access by said UE.

14. The UE of claim 13 wherein said configuration of said at least one processor to obtain resource scheduling information comprises configuration of said at least one processor to: decode time division multiplex (TDM) subframe partition information from a system information block (SIB) of at least one stronger cell of said plurality of neighboring cells, wherein said resource scheduling information comprises said decoded TDM subframe partition information.

15. The UE of claim 13 wherein said configuration of said at least one processor to obtain said resource scheduling information comprises configuration of said at least one processor to: read a dedicated resource identification from a plurality of bits in an evolved broadcast channel of one of said plurality of neighboring cells, wherein said resource scheduling information is obtained using said dedicated resource identification.

16. The UE of claim 13 wherein said resource scheduling information indicates at least one resource designated for use by a second UE, said second UE being served by said weak cell.

17. A method of wireless communication for acquiring control information for performing a Random Access Channel Procedure (RACH) at a user equipment (UE), comprising:

decoding, by the UE, system information blocks transmitted by an access point of a strong cell to obtain sub frame partition information useful to identify system information blocks transmitted by another access point of a weak cell, said strong cell being barred from access by said UE, wherein the strong cell is a neighbor of the weak cell and a signal of the strong cell at the UE is stronger than a signal of the weak cell at the UE;

using the subframe partition information, by the UE, to identify the system information blocks transmitted by the other access point of the weak cell;

decoding, by the UE, the system information blocks transmitted by the weak cell to retrieve control information;

using the control information, by the UE, to complete initial random access to the weak cell; and determining, by the UE, that said strong cell is barred from access by said UE, wherein said decoding, by the UE, system information blocks transmitted by said access point of said strong cell to obtain sub frame partition information is performed in response to said determining, by the UE, that said strong cell is barred from access by said UE.

* * * * *